United States Patent
Kato

(10) Patent No.: US 7,404,374 B2
(45) Date of Patent: Jul. 29, 2008

(54) GAUGE POINTER AND LIGHT GUIDE STRUCTURE

(75) Inventor: Takahira Kato, Novi, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 11/593,825

(22) Filed: Nov. 7, 2006

(65) Prior Publication Data

US 2008/0105191 A1 May 8, 2008

(51) Int. Cl.
G01D 11/28 (2006.01)
G12B 11/02 (2006.01)

(52) U.S. Cl. ............... 116/286; 116/288; 116/DIG. 36; 362/29

(58) Field of Classification Search ................ 116/62.1, 116/62.4, 250, 251, 256, 257, 286, 287, 288, 116/300, 301, DIG. 5, DIG. 6, DIG. 36; 362/23, 28, 29, 30
See application file for complete search history.

(56) References Cited

U.S. PATENT DOCUMENTS

| 3,054,379 | A | * | 9/1962 | Kemeny ..................... 116/257 |
| 4,258,643 | A | | 3/1981 | Ishikawa et al. |
| 4,625,262 | A | | 11/1986 | Sakakibara et al. |
| 5,259,333 | A | * | 11/1993 | Iino et al. .................... 116/286 |
| 5,291,851 | A | | 3/1994 | Muramatsu |
| 5,319,527 | A | | 6/1994 | Murphy et al. |
| 5,546,888 | A | | 8/1996 | Skiver et al. |
| 5,839,809 | A | | 11/1998 | Ishimaru et al. |
| 5,915,822 | A | | 6/1999 | Ogura et al. |
| 6,032,608 | A | | 3/2000 | Oreans et al. |
| 6,065,846 | A | | 5/2000 | Kato et al. |
| 6,276,809 | B1 | | 8/2001 | Matsumoto |
| 6,302,551 | B1 | | 10/2001 | Matumoto |
| 6,312,136 | B1 | | 11/2001 | Kalashnikov |
| 6,585,385 | B2 | | 7/2003 | Nakagawa et al. |
| 6,915,758 | B2 | * | 7/2005 | Nakagawa et al. .......... 116/286 |
| 6,955,438 | B2 | | 10/2005 | Ishii |
| 6,966,663 | B2 | | 11/2005 | Wada et al. |
| 7,038,976 | B2 | | 5/2006 | Winkler et al. |
| 7,048,397 | B2 | | 5/2006 | Birman |

(Continued)

FOREIGN PATENT DOCUMENTS

JP 2002039807 A * 2/2002

(Continued)

Primary Examiner—R. A. Smith
(74) Attorney, Agent, or Firm—Harness, Dickey & Pierce, PLC

(57) ABSTRACT

A gauge with indicating pointer has three light sources on a printed circuit board. A rear dial plate has rear markings such as MPH indicia. The first light source illuminates the pointer length, which points to the rear indicia. The second light source illuminates a front dial assembly located on an opposite side of the indicator as the rear dial plate by passing light through the thickness of the indicator. The front dial assembly is cantilevered over the rotating pointer to permit pointer rotation. The third light source illuminates the rear indicia. The front dial assembly has a front dial plate with front indicia illuminated by the second light source and to which the pointer points. The three light sources may be different colors since each illuminates a specific area of the gauge. The front dial assembly may display a separate lighted scale, such as KPH from the rear markings.

18 Claims, 6 Drawing Sheets

U.S. PATENT DOCUMENTS

| | | |
|---|---|---|
| 7,077,535 B2 | 7/2006 | Wu |
| 7,093,948 B2 | 8/2006 | Fong et al. |
| 2007/0157869 A1* | 2/2007 | Takato ................ 116/286 |
| 2007/0157745 A1* | 7/2007 | Takato et al. ............ 73/866.3 |

FOREIGN PATENT DOCUMENTS

| | | | | |
|---|---|---|---|---|
| JP | 2003075207 A | * | 3/2003 | |
| JP | 2003254794 A | * | 9/2003 | |
| JP | 2003344118 A | * | 12/2003 | |
| JP | 2004233241 A | * | 8/2004 | |
| JP | 2004279124 A | * | 10/2004 | |
| JP | 2005274438 A | * | 10/2005 | |
| JP | 2006220622 A | * | 8/2006 | |
| JP | 2006234617 A | * | 9/2006 | |

* cited by examiner

GAUGE POINTER AND LIGHT GUIDE STRUCTURE

FIELD

The present disclosure relates to a vehicle gauge and light guide structure. More specifically, the disclosure relates to a light guide structure with an indicator that is capable of passing light through its thickness to provide light to a dial in front of the pointer.

BACKGROUND

The statements in this section merely provide background information related to the present disclosure and may not constitute prior art. A conventional vehicle gauge, such as a speedometer gauge, typically has a light source positioned on a printed circuit board ("PCB") to direct light to the gauge face or through the gauge face to make any indicia, such as numbers, visible to a person viewing the gauge. Additionally, gauges known in the art may have a pointer that is illuminated when light is directed through the pointer length from one end of the pointer.

While current vehicle gauges have generally proven to be satisfactory for their applications, each is associated with its share of limitations. One limitation of current gauges is that light can not be directed onto a second gauge face in front of the pointer using a light source behind the pointer. Another limitation of current gauges is that light can not be passed to a second gauge face in front of the pointer using current gauge structures, such as a single PCB. Still yet another limitation is that projecting light to a gauge face in front of a pointer traditionally requires wiring or electrical leads in front of the pointer, which may limit gauge function, such as pointer rotation sweep angle. Finally, current pointers do not permit light to pass through their thicknesses, so that such light may be further used in other areas of the gauge.

What is needed then is a device that does not suffer from the above limitations. This, in turn, will provide a device that permits a second gauge face in front of a gauge pointer to be illuminated but that does not require a printed circuit board or wiring in front of the pointer to illuminate the second face. Additionally, a device will be provided with a face in front of the pointer that does not interfere with pointer rotation operation. Finally, a device will be provided that has a gauge face in front of the pointer that permits indicia to be illuminated with a different color as the main or rear scale indicia and different from the pointer.

SUMMARY

An indicating instrument employs a pointer that rotates in front of a rear gauge face and behind a front gauge face to measure or indicated a quantity such as vehicle speed. A printed circuit board may have three separate light sources situated on it; for instance, a main, or rear, dial plate has rear indicia illuminated by a first light source, a pointer may be illuminated by a second light source, and front indicia on a front dial face may be illuminated by a third light source. A pointer capable of rotating may be positioned in front of the rear dial plate to point to the rear indicia as the measured quantity changes, yet remain behind the front dial plate to point to the front indicia.

Light from the first light source may be directed lengthwise through the pointer indicator to illuminate the indicator. The front dial plate, which may be part of a separate front dial assembly, located on an opposite side of the indicator as the rear dial plate, may be cantilevered over the pointer instrument to permit free rotational movement of the pointer. The second light source may provide illumination to the front dial assembly as light from the second light source is directed through a thickness of the rotating indicator before passing into the front dial assembly. A third light source on the printed circuit board illuminates the rear indicia. Because the light from each of the three light sources do not mix or interfere with each other, the three light sources may each be different colors for an overall aesthetically pleasing appearance.

The front dial assembly may further utilize an outer ring, an inner ring, and a front dial plate that are illuminated by the second light source and a non-illuminated separator ring, which provides contrast when positioned between the outer ring and the inner ring. The front dial plate may possess indicia that correspond to possible pointer positions, such as kilometer per hour (KPH) markings while the rear plate indicia may indicate miles per hour (MPH) markings. A third light source illuminates the rear indicia.

DRAWINGS

The drawings described herein are for illustration purposes only and are not intended to limit the scope of the present disclosure in any way.

DETAILED DESCRIPTION

Figure 1:
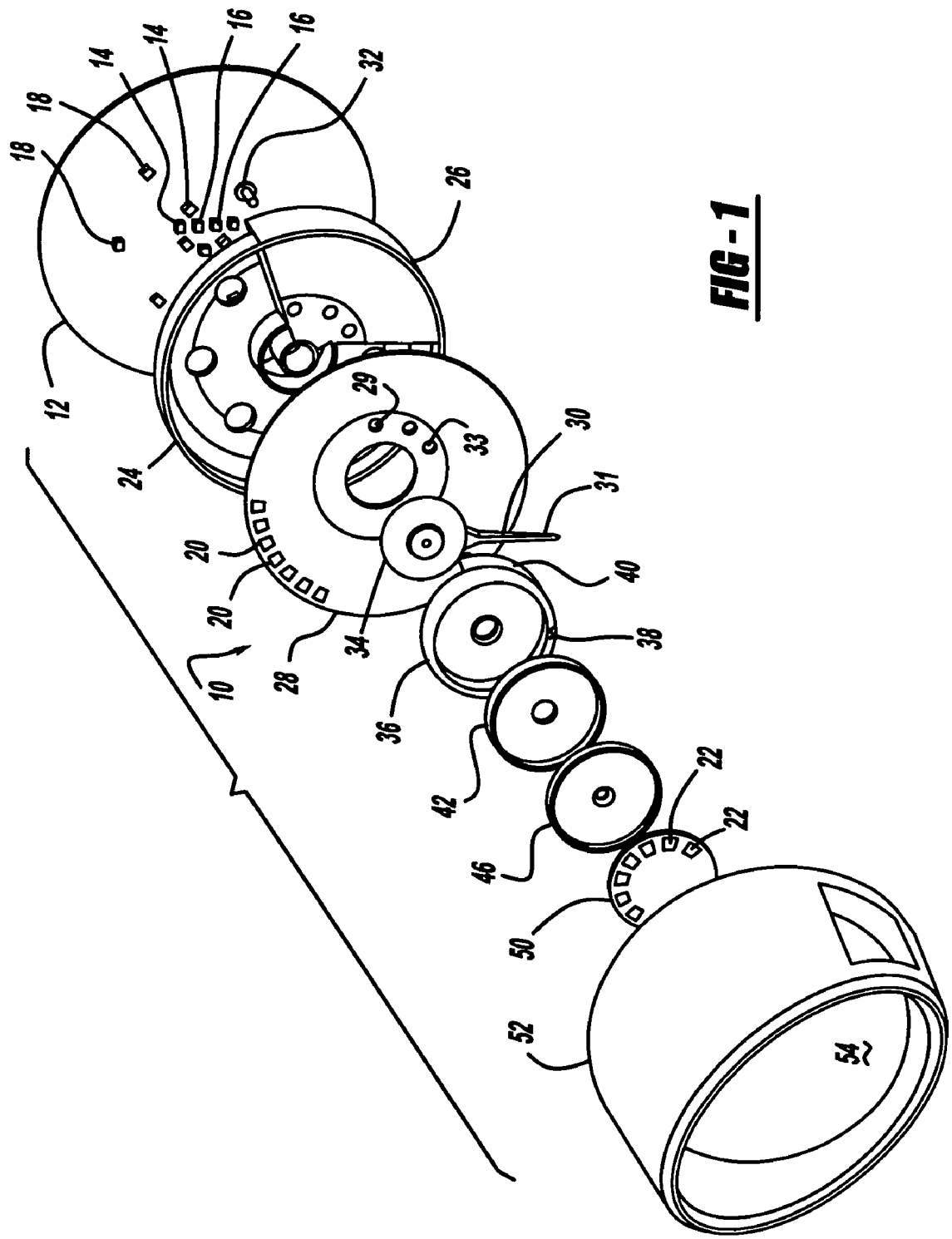
FIG. 1 is an exploded view of a gauge structure.

The following description is merely exemplary in nature and is not intended to limit the present disclosure, application, or uses. Throughout the drawings, corresponding reference numerals indicate like or corresponding parts and features.

Turning now to FIG. 1, an exploded view of a gauge 10 is depicted. More specifically, the gauge 10 is an assembly of various parts such as, but not limited to, a printed circuit board 12 ("PCB") and groupings of light emitting diodes 14, 16, 18 ("LED"). A first plurality of light emitting diodes 14, a second plurality of light emitting diodes 16, and a third plurality light emitting diodes 18 provide the necessary light to the rear indicia 20 and front indicia 22. The rear indicia 20 may represent vehicle speeds measured in miles per hour (MPH), as on a speedometer, that a vehicle may undergo as it is driven. As a second, separate scale, the front indicia 22 may represent a different vehicle speed scale, such as kilometers per hour (KPH). Indicating both scale on the same gauge is convenient for drivers who, for instance, drive in the United States and Canada on a regular basis and require both scales. The same indicating instrument, or pointer 30, may be used to indicate the speed on both scales at the same time.

Continuing with FIG. 1 from the PCB 12, major components of the indicating instrument or gauge 10 are a cup 24 surrounded by a housing 26, the housing 26 covered by a forming dial 28 on one side. The forming dial 28 has indicia 20, which denote miles per hour (MPH) for example, etched or molded into it to provide markings to which a pointer 30 points as the pointer 30 rotates about the forming dial 28. The pointer 30 may also be referred to as an indicating instrument, or simply an indicator. The forming dial 28, cup 24, and housing 26 mount onto the PCB 12 using locator pins 27 that reside in locator holes 29, 33 and at least one fastener 32. With the installation of the pointer hub 34 over the forming dial 28 and housing 26, the forming dial 28 and first set of indicia 20 can be described as being behind the pointer 30. The pointer hub 34 fits over the pointer 30, yet a center section of the pointer hub 34 permits one to see the illuminated pointer 30.

Continuing with FIG. 1, an outer ring 36 has an outer ring land 38. The outer ring 36 with outer ring land 38 is attached to an outer ring post 40, which attaches to the assembly of the forming dial 28, housing 26, cup 24, and PCB 12 via the at least one fastener 32. Fitting over and into the outer ring 36 is a separator disk 42, which also has a land 44. Next, an inner ring 46 with an inner ring land 48 fits over and into the separator disk 42. An inner or front dial 50 with front indicia 22 fits over and into the inner ring 46. The entire assemblage is then encapsulated with the gauge housing 52, which has its frontal area covered by a gauge housing cover 54.

Figure 2:
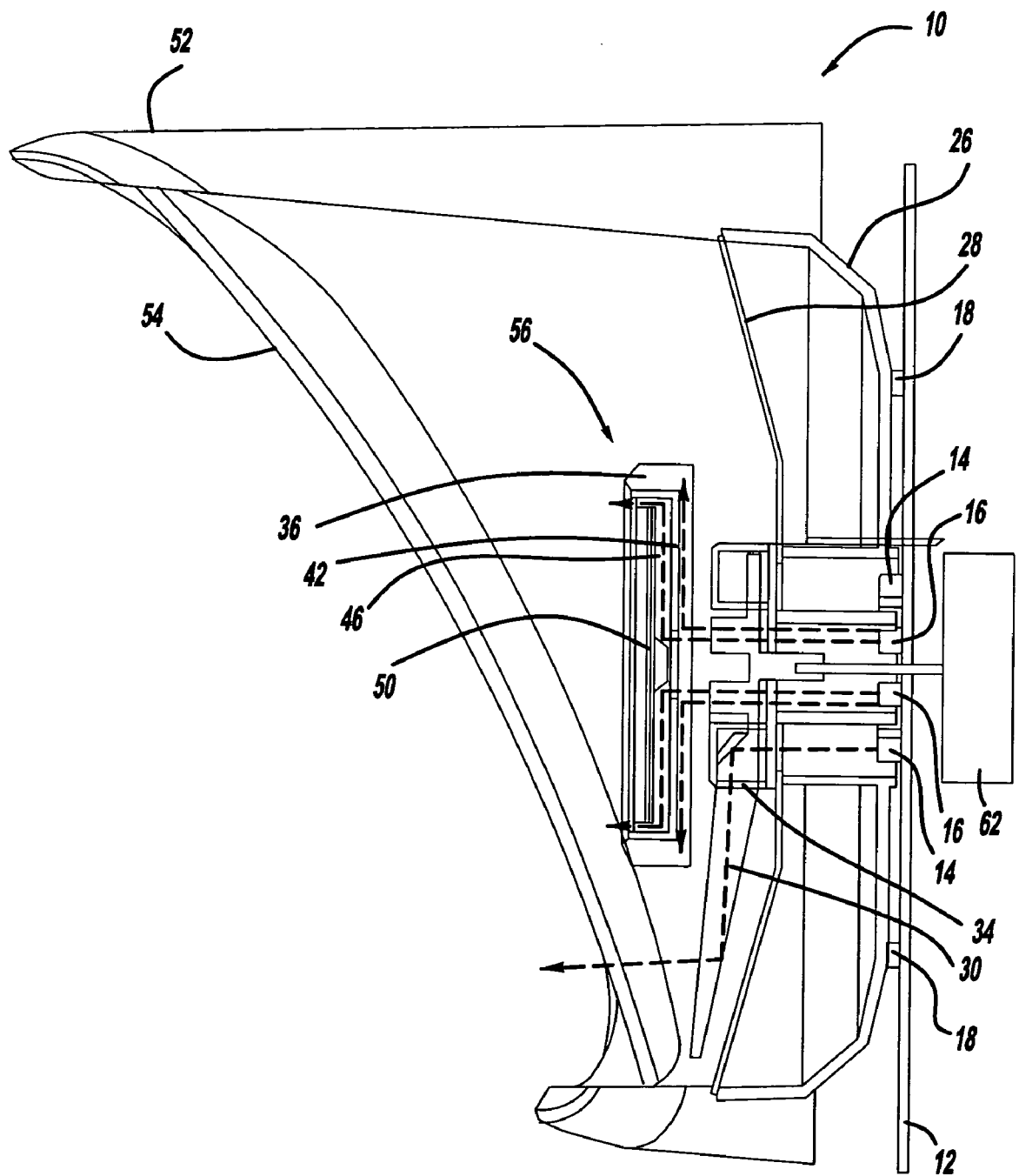
FIG. 2 is a side view of the gauge structure of FIG. 1.
Figure 3:
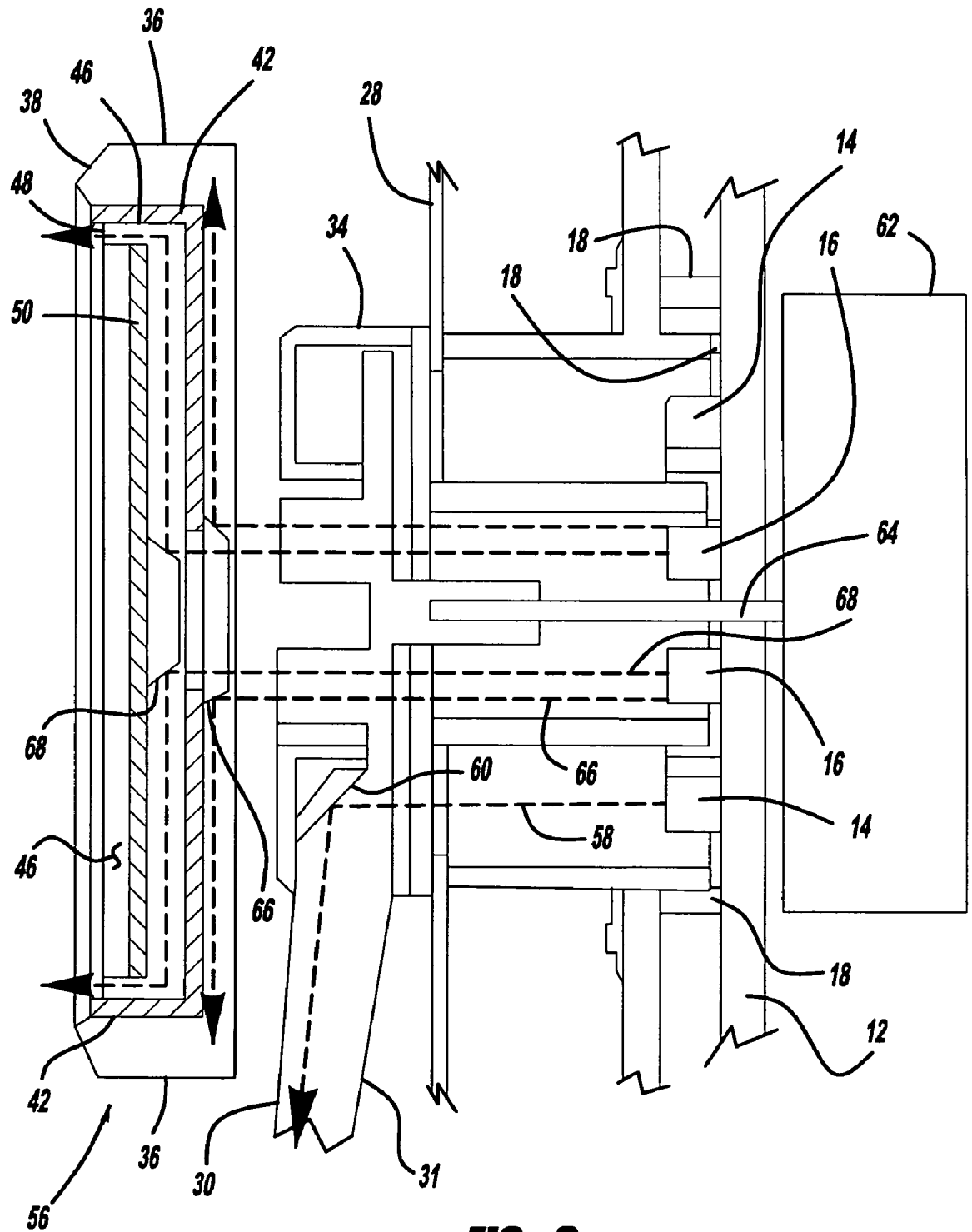
FIG. 3 is an enlarged side view of a gauge structure of FIG. 2.

FIG. 2 depicts a side view of the gauge structure 10 of FIG. 1. More specifically, the front dial assembly 56 or center ring assembly is depicted in front of the pointer 30, as opposed to the forming dial 28, which is located behind the pointer 30. Now, with additional reference to FIGS. 3-6, more detailed operation of the gauge 10 and its LED lighting will be explained. Turning to FIG. 3, the LEDs 14, 16 and 18 are depicted resident on the PCB 12. A number of LEDs 14 provide light to the pointer 30. More specifically, the light beam 58 from LED 14 projects into the pointer 30 and is reflected from the chamfer 60 so that light is projected throughout the longitudinal length of the pointer 30. In this manner, only the pointer 30 is illuminated by the color of the LED 14. The LEDs 14 provide consistent and steady light to the pointer 30 even as the pointer 30 rotates about the face of the forming dial 28. Such lighting is possible because the LEDs 14 are arranged in a circular pattern, as is depicted in FIG. 1. The LEDs 14, although arranged in a circular pattern, stop short of a complete 360 degree arrangement because of the outer ring post 40 (FIGS. 1 and 4) which secures the outer ring 36 to the PCB 12. Indicia 20 are lit by LEDs 18 that are positioned about the PCB 12. The pointer motor 62 and associated shaft 64, drives the pointer 30.

FIGS. 1-3 also depict LEDs 16 which supply light to the front dial assembly 56. More specifically, FIG. 3 depicts how the pointer 30 not only passes light longitudinally through the pointer 30 length, but also through its thickness, which is perpendicular to the longitudinal length of the pointer 30. More specifically, LED 16 generates multiple light beams 66, 68. From LED 16, light beam 66 is directed into the outer ring 36, where it reflects from chamfer 66 and is directed through the outer ring 36 to the land 38, which is visible to an observer, such as a vehicle driver. Thus, the outer ring land 38 appears as a light ring to an observer as the light exits the land 38. Similarly, LED 16 also emits light beam 68 into the inner ring 46. More specifically, the light beam 68 enters the inner ring 46 and is reflected by chamfer 68, which directs the light beam through the inner ring 46 where it exits at the inner ring land 48. Because the light exits the inner ring land 48, the light, in the shape of a circular ring, is visible to an observer. The front or inner dial 50 also transmits light from the front indicia 22 in the front dial 50.

Regarding materials of particular parts of the gauge 10, the outer ring 36 may be made of the transparent plastic polymethyl methacrylate (PMMA), the separator ring 42 may be made of Acrylonitrile Butadiene Styrene (ABS), the inner ring 46 may be made of the transparent plastic polymethyl methacrylate (PMMA) and the inner dial 50 may be made of polycarbonate (PC) sheet. However, the structure of the present teachings is not limited to such, and as a result, structural portions that must transmit light from the LEDs, may be made of any suitable lightweight plastic.

Figure 4:
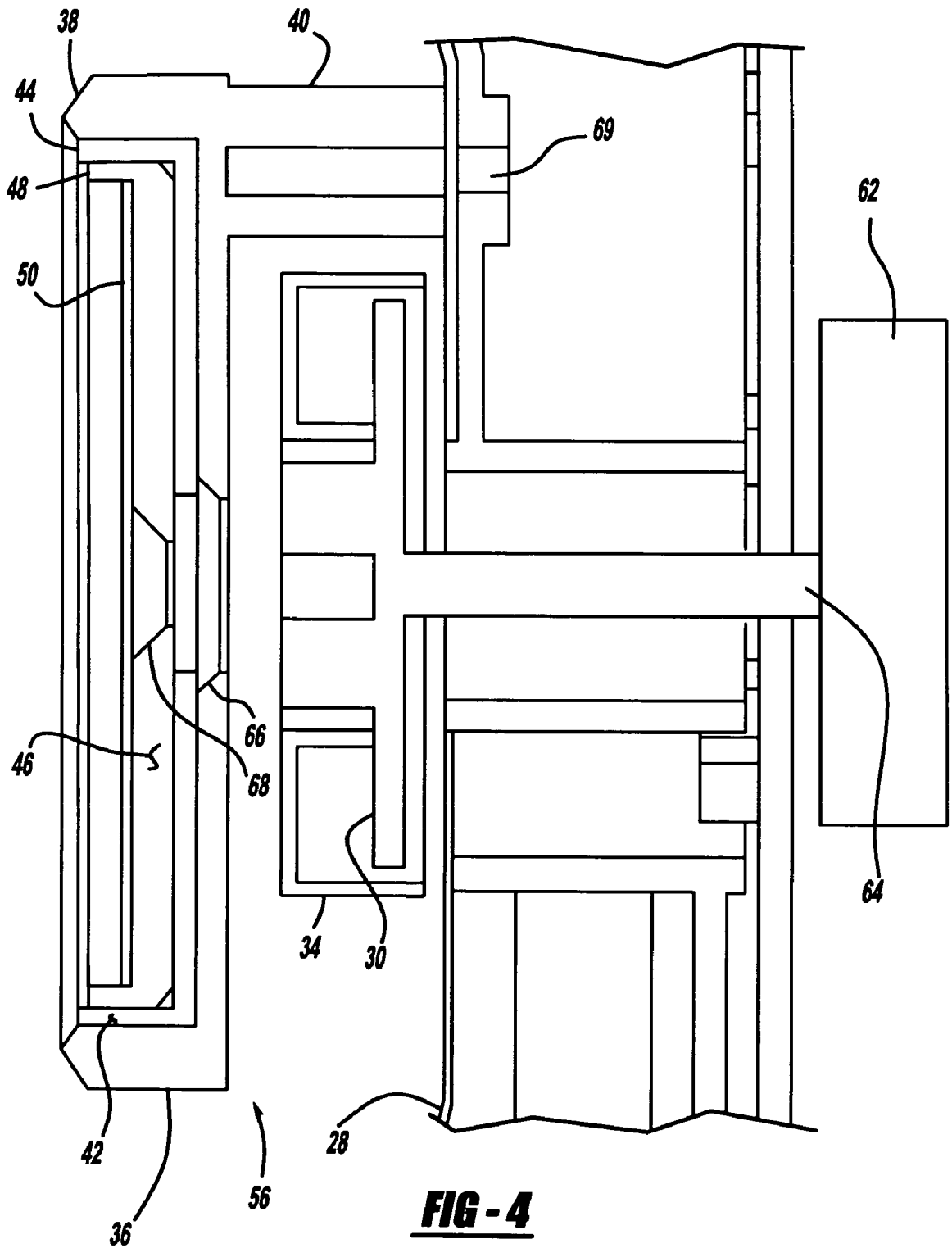
FIG. 4 is an enlarged cross-sectional view of the gauge structure taken about the line 4-4 of FIG. 6.
Figure 6:
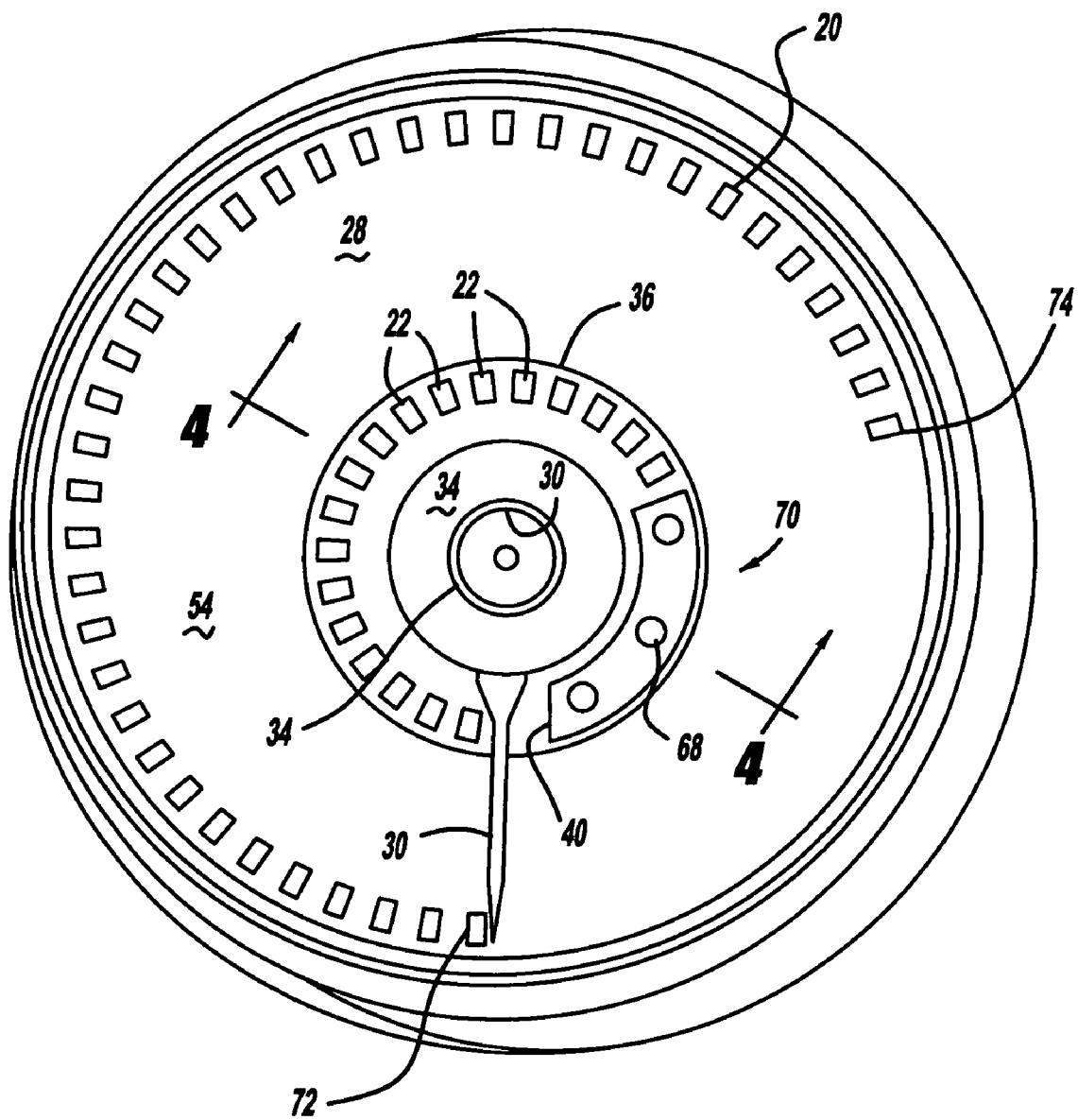
FIG. 6 is a front view of a gauge structure depicting an attachment location of an auxiliary face.

Continuing with FIG. 4, which is an enlarged cross-sectional view of the gauge structure taken about the line 4-4 of FIG. 6, a separator disk 42 resides between the outer ring 36 and the inner ring 46. In the present teachings, the separator disk 42 is not a light transmitting part, and therefore, light does not pass through the separator disk 42. However, the separator disk 42 has a separator disk land 44, which provides a non-illuminated ring of contrast between the light emitting outer ring land 38 and the light emitting inner ring land 48 when viewed by an observer. Continuing, FIG. 4 depicts the outer ring post 40 that supports the cantilevered front dial assembly 56. As depicted the outer ring post 40 with front dial assembly 56 mounts above the printed circuit board 12 via fastener 32 through fastener hole 69 and forms a cantilevered structure of the front dial assembly 56 over the pointer 30 and pointer hub 34.

Figure 5:
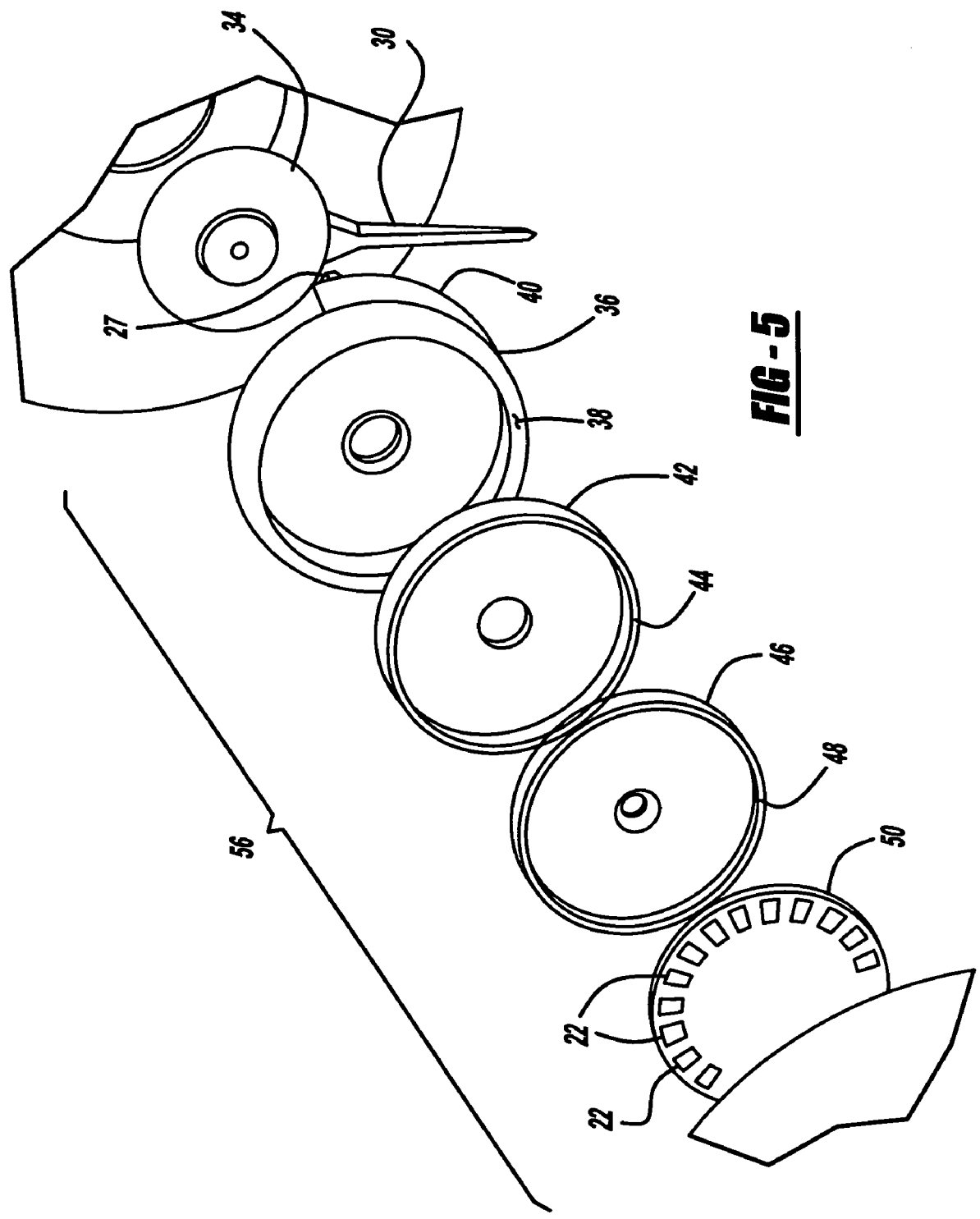
FIG. 5 is an enlarged partial exploded view of the gauge structure of FIG. 1.

FIG. 5 is an enlarged partial exploded view of the gauge structure of FIG. 1 and more clearly depicts the outer ring land 38 of the outer ring 36, the separator disk land 44 of the separator disk 42, and the inner ring land 48 of the inner ring. FIG. 5 also depicts the front or inner dial 50 with front indicia 22. The outer ring 36, separator disk 42, inner ring 46, and inner dial 50 may be assembled by press fitting the parts together, such as in an interference type of fit. Additionally, parts 36, 42, 46 and 50 may be glued together using a clear adhesive.

FIG. 6 is a front view of the gauge structure depicting an attachment location of the front dial assembly 56. More specifically, the fastening location 70 of the outer ring post 40 is depicted in an area where the pointer 30 does not rotate due to interference of the post 40 and also the fastener 32 (FIG. 1) that passes through the fastener hole 69. As depicted, the pointer 30 may rotate clockwise from indicia 72 to indicia 74. The teachings of the invention permit the indicia 20 of the forming dial 28 and the indicia 22 of the inner dial 50 to be illuminated by light sources on a single PCB 12. Furthermore, as depicted in FIGS. 1 and 6, even though the pointer lies between the front dial assembly 56 and the forming dial 28, the center, lighted portion of the pointer 30 is visible to an observer. The pointer hub 34 is not illuminated, and therefore the center portion of the hub 34 reveals the illuminated portion of the pointer 30 from LEDs 16.

There are multiple advantages resulting from the teachings of the present invention. First, the pointer 30 permits light to pass through its elongated portion and also through its thickness, which is generally perpendicular to its longitudinal portion. As light passes through its thickness, the light reaches a second dial structure 56 on the opposite side of the pointer 30 as a first dial structure 28. With light at the second dial structure 56, front indicia 22 may be illuminated. An advantage of light gaining access to a second dial 56 and illuminating portions of the second dial 56 is that the second dial structure 56 does not need to have its own printed circuit board with one or more LEDs, nor do wires or circuitry need to be routed to the second dial structure 56 from the printed circuit board 12 of the first dial structure 28. A second advantage of the lighted indicia 22 on the front dial assembly 56 is that a second scale, such as numbers representing kilometers per hour (KPH) or other speed related data, may be indicated along with say, miles per hour (MPH) indicated by indicia 20.

The description of the invention is merely exemplary in nature and, thus, variations that do not depart from the gist of the invention are intended to be within the scope of the inven-

What is claimed is:

1. An indicating instrument comprising:
a first light source on a printed circuit board;
a rear dial plate having rear indicia;
a rotating indicator illuminated by the first light source and positioned in front of the rear dial plate to point to the rear indicia;
a second light source on the printed circuit board; and
a front dial assembly located on an opposite side of the indicator as the rear dial plate, the front dial assembly illuminated by the second light source on the printed circuit board, wherein light from the second light source passes completely through a thickness of the rotating indicator to illuminate the front dial assembly.

2. The indicating instrument of claim 1, wherein light from the first light source passes completely through a length of the rotating indicator.

3. The indicating instrument of claim 1, wherein the front dial assembly is cantilevered over the rotating indicator.

4. The indicating instrument of claim 1, further comprising:
a third light source, the third light source for illumination of the rear indicia.

5. The indicating instrument of claim 1, wherein the front dial assembly further comprises:
an outer ring, wherein the outer ring is illuminated by the second light source; and
a front dial plate, the front dial plate possessing front indicia that are illuminated by the second light source and to which the rotating indicator points.

6. The indicating instrument of claim 5, the front dial assembly further comprising:
an inner ring disposed within the outer ring, wherein the inner ring is illuminated by the second light source; and
a non-illuminated separator ring positioned between the outer ring and the inner ring.

7. An indicating instrument comprising:
a first light source situated on a printed circuit board;
a rear dial plate having rear indicia;
an indicator positioned in front of the dial plate to point to the rear indicia, wherein light from the first light source is directed through a length of the indicator; and
a front dial assembly located on an opposite side of the indicator as the rear dial plate, the front dial assembly illuminated by a second light source on the printed circuit board, wherein light from the second light source is directed entirely through a thickness of the rotating indicator to illuminate the front dial assembly.

8. The indicating instrument of claim 7, wherein the front dial assembly is cantilevered over the indicator.

9. The indicating instrument of claim 7, the front dial assembly further comprising:
an inner ring; and
a front dial plate attached to the inner ring, the front dial plate possessing front indicia corresponding to pointer positions.

10. The indicating instrument of claim 9, the front dial assembly further comprising:
an outer ring, wherein the inner ring and the outer ring are illuminated by the second light source; and
a non-illuminated separator ring positioned between the outer ring and the inner ring to provide visual contrast.

11. The indicating instrument of claim 10, wherein the front dial plate receives light to illuminate the front indicia.

12. The indicating instrument of claim 11, further comprising a third light source, the third light source for illumination of the rear indicia.

13. An indicating instrument comprising:
a printed circuit board;
a rear dial plate having rear indicia;
a first light source situated on the printed circuit board behind the rear dial plate;
a rotatable indicator positioned in front of the rear dial plate to point to the rear indicia, wherein light from the first light source is directed lengthwise through the indicator to illuminate the indicator;
a front dial assembly located on an opposite side of the indicator as the rear dial plate;
a second light source situated on the printed circuit board, the second light source to provide illumination to the front dial assembly;
wherein:
light from the second light source is directed through a thickness of the rotating indicator before passing into the front dial assembly, and the front dial assembly is cantilevered over the rotating indicator; and
a third light source on the printed circuit board to illuminate the rear indicia.

14. The indicating instrument of claim 13, wherein the front dial assembly further comprises:
an outer ring, wherein the outer ring is illuminated by the second light source;
an inner ring, wherein the inner ring is illuminated by the second light source; and
a non-illuminated separator ring positioned between the outer ring and the inner ring.

15. The indicating instrument of claim 14, further comprising:
a front dial plate possessing indicia corresponding to pointer positions.

16. The indicating instrument of claim 15, wherein the front dial plate receives light from the second light source to illuminate the indicia.

17. The indicating instrument of claim 16, wherein the pointer, the front indicia and the rear indicia are illuminated with different colors.

18. The indicating instrument of claim 17, further comprising:
a third light source for illumination of the rear indicia.

* * * * *